T. SPEAR.
Steering-Apparatus.
No. 201,360.    Patented March 19, 1878.
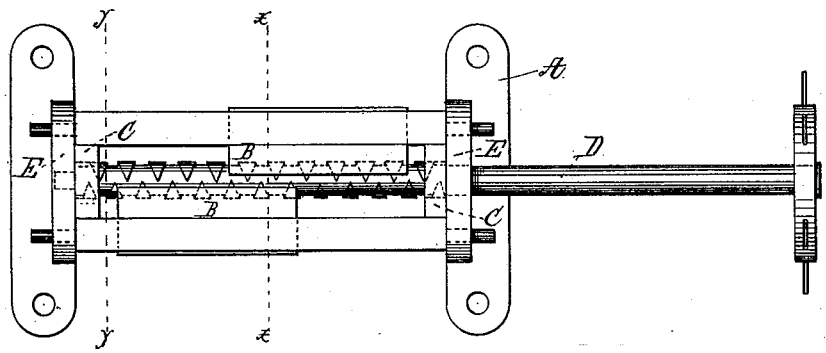
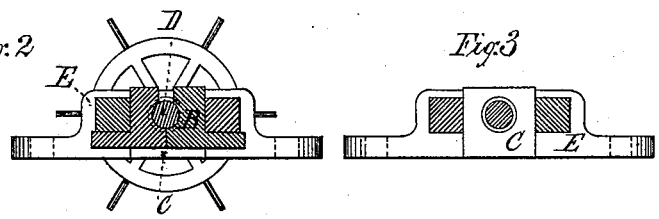
Witnesses                                  Inventor
                                           Thomas Spear,
                                        By C. B. Samson,
                                                  Atty.

UNITED STATES PATENT OFFICE.

THOMAS SPEAR, OF GREEN BAY, WISCONSIN, ASSIGNOR OF ONE-HALF HIS RIGHT TO ARTHUR R. ATKINS AND JAMES L. BECKWITH, OF CHICAGO, ILLINOIS.

IMPROVEMENT IN STEERING APPARATUS.

Specification forming part of Letters Patent No. 201,360, dated March 19, 1878; application filed January 19, 1878.

*To all whom it may concern:*

Be it known that I, THOMAS SPEAR, of the city of Green Bay, in the county of Brown and State of Wisconsin, have invented a new and useful Improvement in Steering Apparatus, which improvement is fully set forth in the following specification, reference being had to the accompanying drawings.

This invention relates to that class of steering apparatus that is worked by a diamond-screw wheel-shaft having two diamond-screw boxes, which move in opposite directions while the wheel is being turned.

Figure 1 represents a plan or top view; Fig. 2, a section at $x\ x$. Fig. 3 represents a section at $y\ y$, showing rubber cushion.

The object of my invention is to prevent the breaking of the wheel, bed-plates, diamond-screw shaft, screw-boxes, or other parts of the steering apparatus, when the wheel is held "hard up" or "hard down," while sailing through a "heavy" sea.

This I accomplish by fitting rubber cushions to the inside of the bed-plates having the diamond-screw shaft pass through them to hold them in position, so that the diamond-screw boxes may have the cushions intervening between them and the bed-plates when the wheel is held hard up or hard down.

In the drawings, A represents the frame-work of steering apparatus with improvement attached. B B are the diamond-screw boxes; C C, the rubber cushions. D is the diamond-screw shaft, and E E are the bed-plates of steering apparatus.

The cushions C C are made of solid rubber, one or more inches in thickness, and are fitted to bed-plates E E, being held in position by the frame-work of steering apparatus, and by having the diamond-screw shaft pass through them, as above set forth.

When the wheel is held hard up or hard down each of the diamond-screw boxes B B will rest directly against one of the rubber cushions C C. If then the rudder is struck by a wave or heavy sea, the spring in the rubber cushions C C will be sufficient to allow a movement to the rudder that it would not possess if the diamond-screw boxes B B rested directly against the bed-plates E E; and by this means I relieve the steering apparatus and rudder from the direct and sudden strain that they would otherwise be required to sustain.

I am aware that buffers have been used to relieve the shock of the sea upon the rudder; but in all cases with which I am acquainted the buffers were located outside the frame of the steerer, and did not relieve the shock upon the frame when the rudder was suddenly thrown hard over.

Having thus described my invention, I claim as new and desire to secure by Letters Patent—

The combination, in a steering apparatus, of the rubber cushions C C applied inside the frame A, diamond-screw boxes B B, bed-plates E E, and diamond-screw shaft D, substantially as and for the purposes described.

THOMAS SPEAR.

Witnesses:
JOHN W. HAGERTY,
GEO. O. SPEAR.